United States Patent
Breiter et al.

[11] Patent Number: 6,075,903
[45] Date of Patent: Jun. 13, 2000

[54] PROCESS FOR CORRECTING THE INTENSITY OF IMAGES FROM A DIGITAL INFRARED CAMERA

[75] Inventors: Rainer Breiter; Wolfgang Cabanski, both of Heilbronn, Germany

[73] Assignee: AEG Infrarot-Module GmbH, Heilbronn, Germany

[21] Appl. No.: 09/061,147

[22] Filed: Apr. 16, 1998

[30] Foreign Application Priority Data

Apr. 17, 1997 [DE] Germany .................... 197 15 983

[51] Int. Cl.$^7$ .................. G06T 5/20; G06K 9/40
[52] U.S. Cl. ............ 382/261; 382/262; 382/274
[58] Field of Search .................. 382/274, 261, 382/262, 254, 275, 260; 250/252.1, 332

[56] References Cited

U.S. PATENT DOCUMENTS

| | | |
|---|---|---|
| 4,975,864 | 12/1990 | Sendall et al. . |
| 5,420,421 | 5/1995 | Lindgren et al. .............. 250/252.1 |
| 5,514,865 | 5/1996 | O'Neil . |
| 5,606,631 | 2/1997 | Weiss et al. .............. 382/275 |

FOREIGN PATENT DOCUMENTS

| | | |
|---|---|---|
| 0601534 | 6/1994 | European Pat. Off. . |
| 0653882A1 | 5/1995 | European Pat. Off. . |
| 97/05742 | 2/1997 | WIPO . |

*Primary Examiner*—Scott Rogers
*Attorney, Agent, or Firm*—Venable; George Spencer; Norman N. Kunitz

[57] ABSTRACT

The invention concerns a process to correct the intensity of images from a digital infrared camera with a two-dimensional detector. First a stationary correction is made at a reference source to determine correction coefficients. For the stationary correction, an average intensity characteristic curve $U_{av}(T)$ is determined for the detector and compared with the intensity characteristic curve $U_j(T)$ for each image point j of the two-dimensional detector to determine correction coefficients for each image point j. A non-linear formulation is used to adapt the intensity characteristic curve $U_j(T)$ of each image point to the average intensity characteristic curve $U_{av}(T)$. Correction coefficients are stored in a memory to correct the individual intensity $U_j$ of each image point j during operation. During operation, the correction coefficients are improved dynamically. The intensity Uj of an image is recorded and the intensity Uj of the image is filtered by a locally acting adaptive filter. Then the remaining imaging error is determined using intensity Uj of the unfiltered image and intensity F(Uj) of the filtered image and the correction coefficients are improved using the ascertained remaining imaging error.

7 Claims, 4 Drawing Sheets

Structure of adaptive, dynamic correction

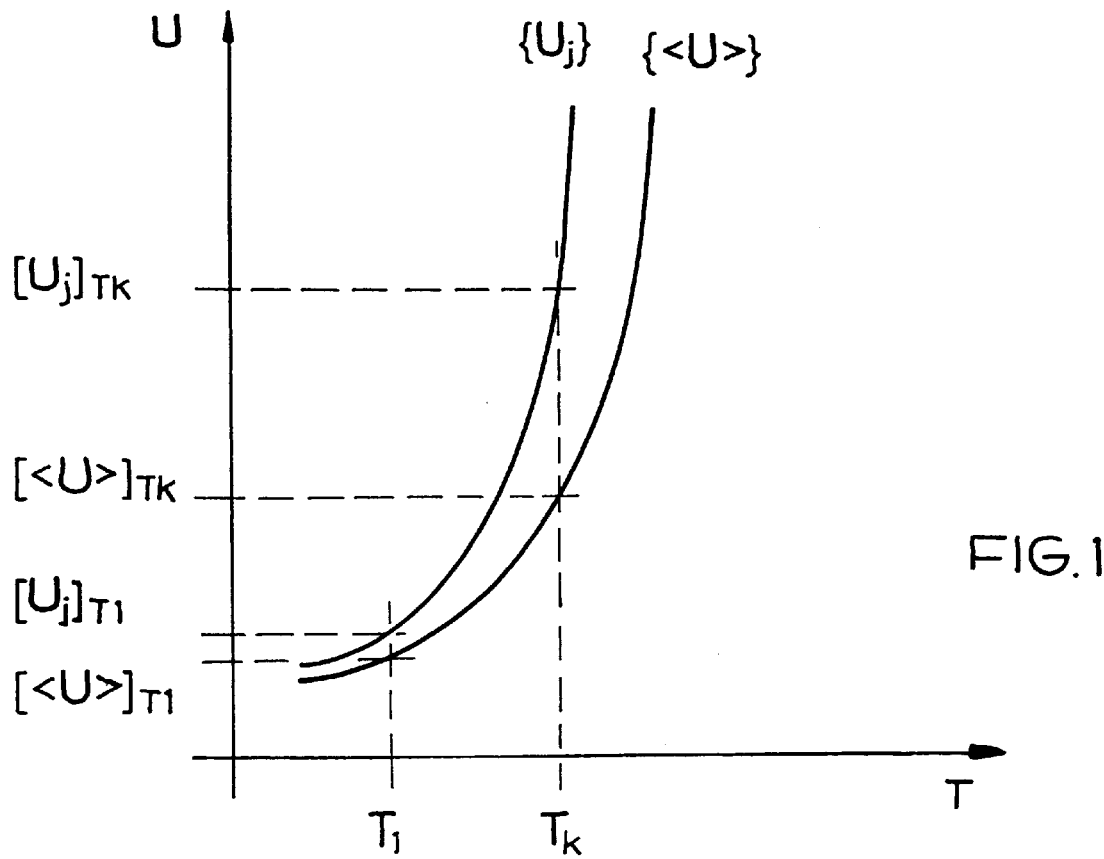
Family of characteristic curves for the detector
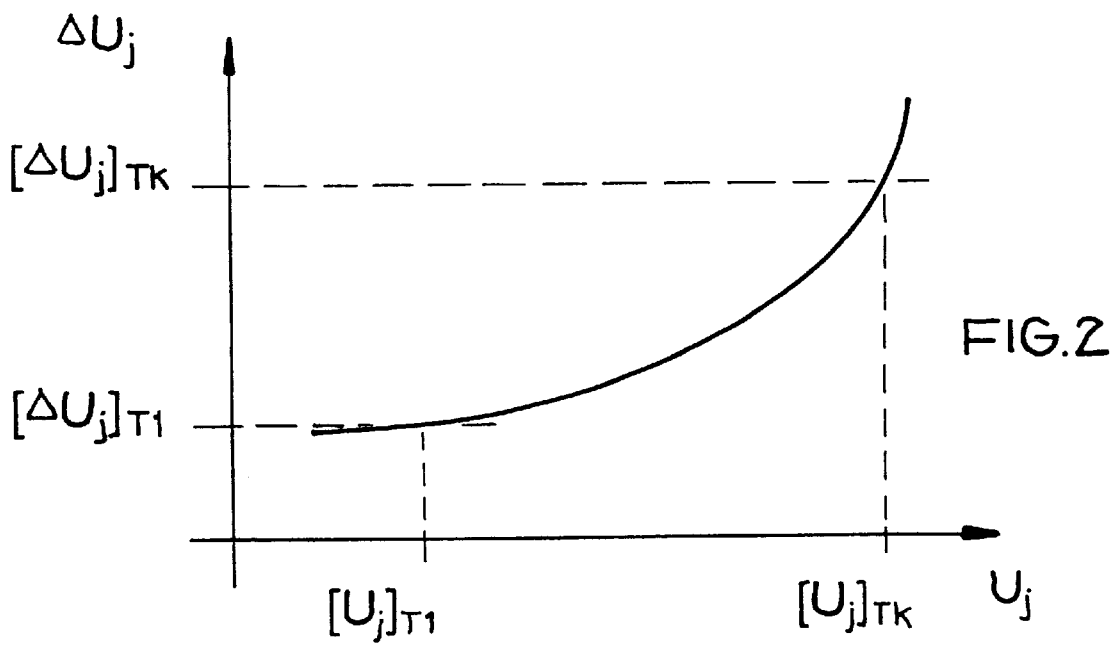
Deviation from the average characteristic curve

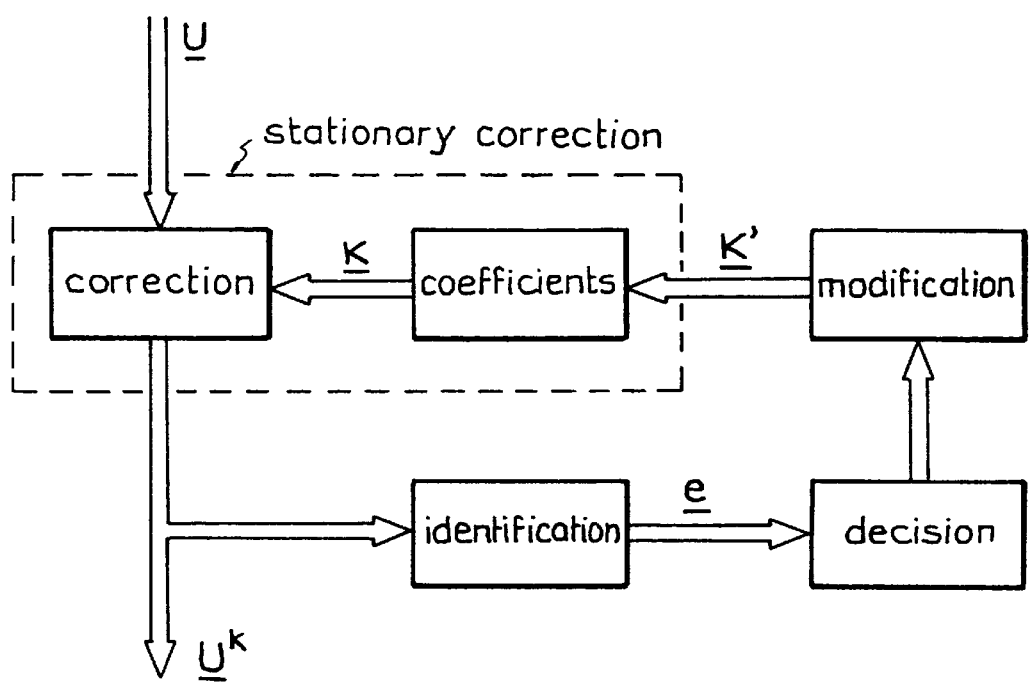
Structure of adaptive, dynamic correction   FIG. 3

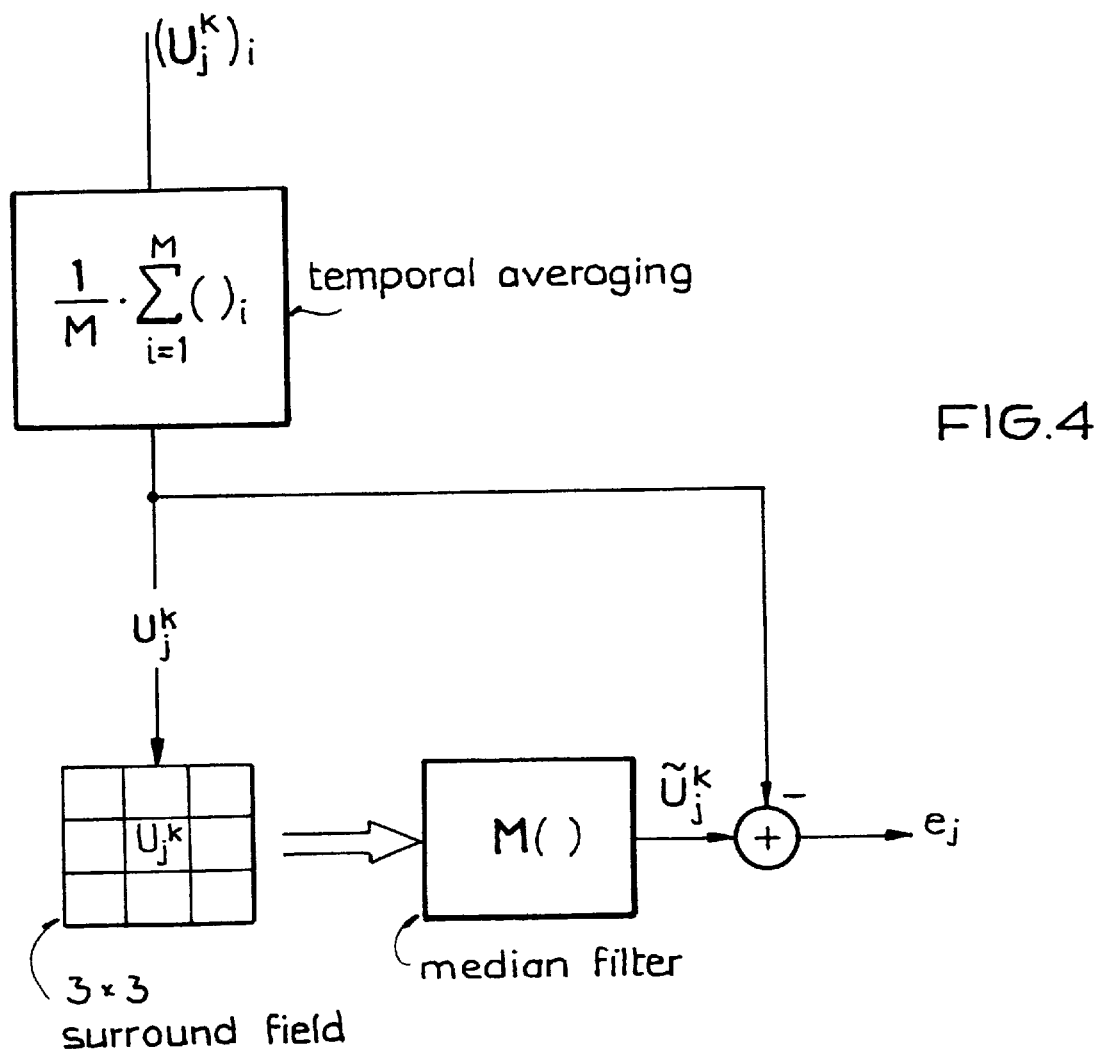
Block diagram of imaging error identification
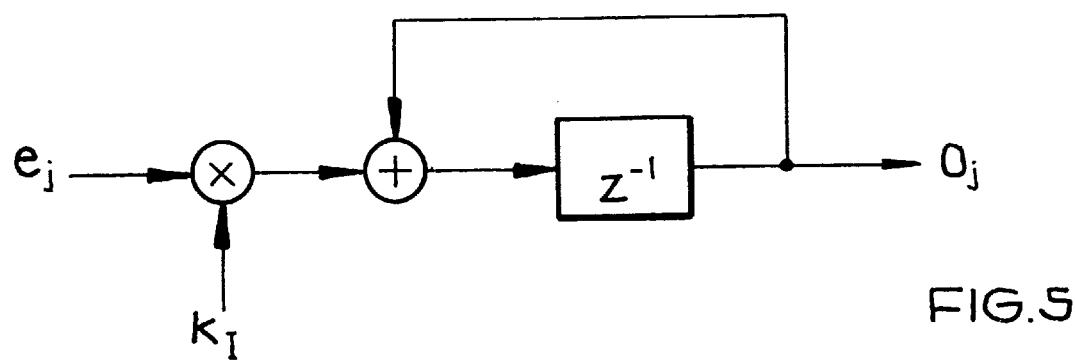
Block diagram of coefficient modification

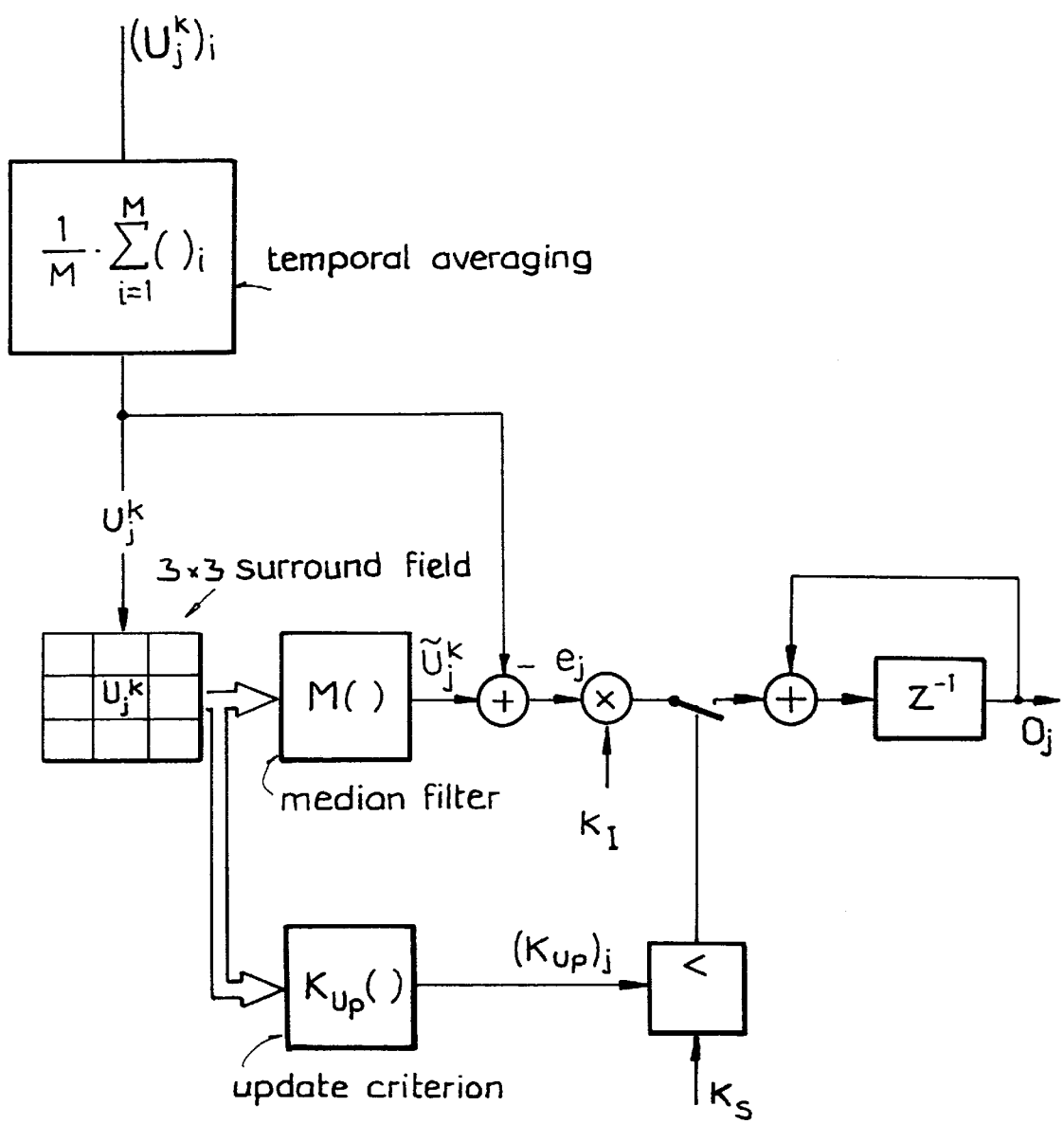
Block diagram of offset coefficient adaption  FIG. 6

PROCESS FOR CORRECTING THE INTENSITY OF IMAGES FROM A DIGITAL INFRARED CAMERA

BACKGROUND OF THE INVENTION

Since the seventies, Messrs AIM AEG Infrarot Module GmbH has been manufacturing high-quality Infrared detectors and associated components such as heat sinks and read-out electronics. The detectors are used by the military, for research, in medicine and in industry. In the latest generation of detectors, the separate elements are arranged in a two-dimensional structure in the surface and a mechanical scanner is no longer required for image formation. With the two-dimensional detector, a suitable optical system can project a scene directly onto the photosensitive chip. The separate elements are read out sequentially and additional computer processing re-assembles them to a two-dimensional data structure, an image.

The technology causes detector inhomogeneity in the separate elements, thus producing an imaging error. There is both time-invariant and time-variant inhomogeneity. Previous line cameras, with a one-dimensional detector structure, solve the problem by having the detector look regularly at a reference source when scanning the scene and using this information to re-calibrate. The enormous expenditure involved in transferring this process to a detector with a two-dimensional structure makes it impractical. With two-dimensional detectors, time-invariant inhomogeneity can be corrected by a one-off calibration at a thermal reference source. It would then be possible to allow the user to post-calibrate time-variant inhomogeneity at a thermal reference source. This expenditure is worth avoiding.

SUMMARY OF THE INVENTION

The task of the invention therefore, is to provide a process to correct the intensity of images from a digital infrared camera with a two-dimensional detector, which is basically automatic and which also balances out the detector's time-variant inhomogeneity.

This task is solved by a process with the attributes of the independent patent claims. The further development of the process results from the attributes in the dependent claims.

BRIEF DESCRIPTION OF THE DRAWINGS

FIG. 1 shows the family of characteristic curves for the detector.

FIG. 2 shows the deviation from the average characteristic curve.

FIG. 3 shows the structure of adaptive dynamic correction.

FIG. 4 shows a block diagram of imaging error identification.

FIG. 5 shows a block diagram of coefficient modification.

FIG. 6 shows a block diagram of offset coefficient adaptation.

DESCRIPTION OF THE PREFERRED EMBODIMENTS

The pith and marrow of the process is that each pixel is adjusted to an average characteristic curve of the overall detector array. The imaging error from the inhomogeneity of the detector array is previously determined by reference measurements. Each pixel is corrected individually by a correction with n coefficients. A polynomial of the n-th order is chosen for the deviation of the individual pixel characteristic curves from the average characteristic curve. The coefficients are determined by the least square method. It is a prerequisite for this method that there is no interaction between the separate elements, or that if there is, it is negligible, as each pixel is corrected independently of its neighbor.

FIG. 1 shows the family of characteristic curves for a detector. The following are applicable here:

$\{U_j\}$: pixel-specific characteristic curve $\{<U>\}$: average characteristic curve for the array $[U_j]_{Tk}$: averaged value over N measurements at temperature k of pixel j.

$[<U>]_{Tk}$: averaged value over N measurements at temperature k over all pixels The aim is to adjust all the individual pixels to the average characteristic curve of the array, in accordance with the following equation.

$$\{U_j^k\} - \{<U>\} \stackrel{!}{=} \{0\}$$

A polynomial of the n-th order is chosen for the deviation of the individual pixel characteristic curves from the average characteristic curve:

$$\underline{\Delta U}^a = \underline{a}_n \cdot (\underline{U})^n + \underline{a}_{n-1} \cdot (\underline{U})^{n-1} + \ldots + \underline{a}_1 \cdot \underline{U} + \underline{a}_0$$

The characteristic curve is measured at k checkpoints. This produces the deviation from the average characteristic curve at temperature i:

$$[\Delta U_j]_{Ti} = [<U>]_{Ti} - [U_j]_{Ti}; \text{ where } i = 1 \ldots k$$

FIG. 2 shows a graph of this function.

Determining the correction coefficients

The correction coefficients result from the requirement:

$$\sum_{i=1}^{k} ([\Delta U_j^a]_{T_i} - [\Delta U_j]_{T_i})^2 \stackrel{!}{=} \text{Min.}$$

The formulation $$\frac{\partial}{\partial a_m} \sum_{i=1}^{k} ([\Delta U_j^a]_{T_i} - [\Delta U_j]_{T_i})^2 = 0$$

where $m = 0 \ldots n$ produces a linear system of equations with n+1 equations, where, for example, the Gaussian elimination method can be used to determine the coefficients.

The pixels can be corrected using the ascertained coefficients. This produces the following correction equation:

$$\underline{U}^k = \underline{U} + \underline{\Delta U}^a = \underline{U} + \underline{a}_n \cdot (\underline{U})^n + \underline{a}_{n-1} \cdot (\underline{U})^{n-1} + \ldots + \underline{a}_1 \cdot \underline{U} + \underline{a}_0$$

in practice, a linear formulation has not proven adequate for curve fitting. A non-linear formulation is therefore necessary. Furthermore, not only have formulations with polynomial development of at least the second order proven to be suitable, but so have other non-linear formulations, such as those based on exponential functions.

The correction coefficients ascertained for the correction of each image point are stored in a memory and used to correct the intensity of the images generated by the detector system. This takes place in real time, when the images are displayed on-screen by a suitable image processing system.

Determination of the correction values for the global correction in the local area described above is basically a one-off operation when the detector system is calibrated during manufacture. Post-calibrations can also be implemented at longer intervals, for example, during servicing.

With an image corrected in accordance with the process described above, drifting can be detected of pixel parameters with large time constants in the hours to minutes range. For those who are looking at the images, the imaging error this causes appears as a fixed local noise.

The steps of the process described below counterbalance the imaging errors by an adaptive improvement of the correction coefficients of each image point. Based on global correction in the local area, the coefficients can be adjusted to respond to the drifting of the pixel parameters.

It is therefore the aim of dynamic correction to counterbalance the drift effect of the pixel parameters and to make it unnecessary to re-determine the correction coefficients of each image point at a reference object. The information about the imaging error must be independent of the scene observed as coefficient adaptation must not include any scene information.

The adaptive, dynamic correction process is based on self-adjustment of the correction coefficients of the global stationary correction, at regular intervals. It is preferable to use the square correction as the stationary correction process. Other non-linear formulations can be used for curve fitting. Dynamic correction presents a closed iterative loop from the stationary correction and adaptation blocks, where adaptation comprises the identification, decision and modification blocks. Identification is used to obtain information from the corrected image on the imaging error of an individual pixel, independently of the scene observed. The decision process is followed by the modification of the coefficients, aimed at making the imaging error converge upon zero as fast as possible: $e \rightarrow 0$.

FIG. 3 is a flow chart for the structure of adaptive, dynamic correction. The following apply here U: uncorrected image Uk: corrected image K: correction coefficients e: imaging error K': modified coefficients Because of the type of imaging error (pulse noise) it is sufficient to provide information from the local surround field of each pixel to identify an imaging error. The scene information must be suppressed, as otherwise it would be included in correction coefficient modification.

A 3×3 median filter has proven to be particularly reliable as the local filter operator for the present embodiment of the process. The imaging error is determined from the difference between the median and the pixel value.

With the median filter, the values from the surround field of pixel j are sorted by size to a series of numbers $U_k^j\}$, where $U_k^{m-1} < U_k^m < U_k^{m+1}$. The median filter returns the value in the centre of the series of numbers.

$$\tilde{U}_j^k = M(\{U_j^k\}) \text{ with } {}_j^k \text{ corrected value of pixel } j \text{ and } \tilde{}_j^k \text{ median value for pixel } j$$

The imaging error is produced by the difference between the median and the pixel value:

$$e_j = \tilde{U}_k^j - U_j^k$$

$e_j$ imaging error of pixel j.

The imaging error can be used to adjust the correction coefficients.

Furthermore, it is advantageous if the calculation of the imaging error is preceded by temporal averaging of a number of images. In the present embodiment, averaging on a scale of approximately 100 images has proved to be sufficient.

The adjustment of the correction coefficients is based to a large extent on the implemented square correction.

FIG. 4 is a block diagram of imaging error identification.

The condition for ideal identification, i.e. for no scene information to be included, is not actually met. It appears that edges in particular are "burnt in" in the coefficients and that they seem to be superimposed, if the scene changes. This can be avoided by implementing a decision process, which detects whether edges or pulse noise is involved and controls coefficient modification.

Surround field scattering is used as a simple decision criterion, called the update criterion below. This is also used to calculate the median. Sorting of the series of numbers, which is necessary to determine the median, is utilised here.

$$\{U_1^k, U_2^k, U_3^k, U_4^k, U_5^k, U_6^k, U_7^k, U_8^k, U_9^k\}$$

$$_{m-1}^k < U_m^k < U_{m+1}^k$$

m=1 ... 9

Extreme values are excluded for the decision criterion. The following then applies:

$$(K_{up})_j = \sqrt{\frac{1}{7} \cdot \sum_{m=2}^{7} (\tilde{U}_j^k - U_m^k)^2} \text{ ; where } K_{Up}: \text{ decision criterion}$$

A comparison between an edge and pulse interference is shown in simplified form, as an example, in the table below.

|  |  |  |  |  |  |  |
|---|---|---|---|---|---|---|
|  | 1000 | 1000 | 2000 | median |  |  |
| Edge: | 1000 | 1000 | 2000 | $\Rightarrow M(\{1, 1, 1, 1, 1, 1, 2, 2, 2\} \cdot 10^3)$ | $\Rightarrow K_{Up} = 535$ |  |
|  | 1000 | 1000 | 2000 | = 1000 |  | no modification |
|  | 1000 | 1000 | 1000 | median |  |  |
| Pulse: | 1000 | 2000 | 1000 | $\Rightarrow M(\{1, 1, 1, 1, 1, 1, 1, 1, 2\} \cdot 10^3)$ | $\Rightarrow K_{Up} = 0$ |  |
|  | 1000 | 1000 | 1000 | = 1000 |  | no modification |

The decision whether to modify the coefficients is made by comparing decision criterion $K_{up}$ with a threshold value $K_s$. If the numerical value ascertained for decision criterion $K_{up}$ exceeds the given threshold value $K_s$, the correction coefficients for the observed image point are not changed.

$$(K_{Up})_j < (K_S)_j \Rightarrow \text{Modifikation des Pixels } j$$

(modification of pixel j)

$K_s$ threshold value for the modification

This simple criterion produces good results.

To maintain the quality of the image, it is enough to modify the offset coefficients of the square correction. The gain and square coefficients which represent the slope or the non-linear portion of the deviation from the average characteristic curve, can be seen as constant in time.

The simplest way of seeing the ascertained imaging error is to interpret it as an offset error of the stationary correction. A suitable algorithm makes it possible to track the offset coefficients, which are independent of the other coefficients. The conversion produces good results and justifies this interpretation.

In the embodiment, an integral control $\dot{u} = k_1 \cdot e$ is used for improvement. Converted to the offset coefficient, this produces (discretized):

$$(O_j)_{n+1} = (O_j) + k_I (e_j)_n \text{ where:}$$

Oj: offset coefficient of pixel j ej: imaging error of pixel j kl: weighting

FIG. 5 is a block diagram of coefficient modification.

The process realized in the embodiment uses the same imaging error weighting for all the pixels. It would be possible for each pixel to have its own weighting, to match the adaptation to the individual pixel. The weighting, together with the scan time for the update cycle, determines the time constant used for the response to the determined imaging error. Here $k_I \rightarrow 1$ is fast and $k_I 0$ is slow adjustment.

With all components, the block diagram shown in FIG. 6 for the adaptation of offset coefficients is produced for the dynamic part of the correction process:

To realize the correction process, it appears that first an adequate, stationary correction process must be implemented. Because of non-linearities occurring between the pixel characteristic curves, a square correction has proved to be necessary so that the residual inhomogeneity is less than the time interference of the detector. Examination of the dynamic effects reveals drifting, which can be counterbalanced provided the square correction is implemented. The square correction basically reduces the inhomogeneity caused by drifting to a spatial pulse noise, which can be intercepted by local adaptation. It is crucial here that the information on the inhomogeneity can be gained from the local surroundings of the pixel and that it is not necessary to implement a global adjustment, as for the stationary correction.

The process according to the invention comprises a parameter-adaptive control concept with identification, decision process and modification. The adaptive, dynamic correction process makes it possible to calibrate the detector across a wide temperature range, wherein adaptation to each working range, which usually only covers a few Kelvins, is implemented by the correction and is self-adjusting. Residual scene information, not suppressed when the imaging error is determined and included in the coefficients, remains a problem for the process. The consequences are that edges are frozen and that edges are blurred if fixed scenes are observed for a long time. However, the choice of the update threshold parameter and the weighting of the imaging error can produce an acceptable compromise.

Finally, it must be said that the present invention offers long-term stability of two-dimensional infrared detector corrections, without the need to use a thermal reference source for constant recalibration.

What is claimed is:

1. Process to correct the intensity of images from a digital infrared camera with a two-dimensional detector, wherein correction coefficients K are stored for each image point j in the memory of an image processing system. There are the following steps to the process:

Recording the intensity Uj of an image;

Correcting the intensity Uj of the image, using correction coefficients K and temporary storage of the corrected intensity Ukj;

Filtering the corrected intensity Ukj with a locally active adaptive filter M;

Determining the remaining imaging error ej, using intensity Ukj of the unfiltered corrected image and intensity F(Ukj) of the filtered, corrected image;

Improving all correction coefficients K, using the ascertained, remaining imaging error ej;

Storing improved correction coefficients K in the memory of the image processing system.

2. Process according to claim 1, wherein correction coefficients K are determined on a single calibration at a thermal reference source, at the factory.

3. Process according to claim 2, wherein the calibration process has the following steps:

Determining an average intensity characteristic curve <U>(T) for the detector;

Determining correction coefficients K for intensity characteristic curve $U_j(T)$ to the average intensity characteristic curve <U>(T) for each image point j, using a non-linear formulation for curve fitting;

Storing correction coefficients K in the memory of an image processing system, to correct intensity Uj of each image point during operation.

4. Process according to claim 3, wherein a polynomial approximation of the second order is used for curve fitting.

5. Process according to claim 1, wherein a 3×3 median filter is used for adaptive filtering.

6. Process according to claim 1, wherein the remaining imaging error ej corresponds to the difference between intensity Ukj of the unfiltered, corrected image and intensity F(Ukj) of the filtered, corrected image.

7. Process according to claim 1, wherein an additional decision criterion $K_{up}$ must be met for each pixel, in order to improve the respective correction coefficients.

* * * * *